United States Patent [19]

Hayasaki et al.

[11] Patent Number: 4,843,920
[45] Date of Patent: Jul. 4, 1989

[54] COMBINED FORWARD PRESSURE AND TORQUE CONVERTER CONTROL FOR AUTOMATIC TRANSMISSION

[75] Inventors: Koichi Hayasaki, Fujisawa; Kazuhiko Sugano, Yokohama, both of Japan

[73] Assignee: Nissan Motor Co., Ltd., Yokohama, Japan

[21] Appl. No.: 896,228

[22] Filed: Aug. 14, 1986

[30] Foreign Application Priority Data

Aug. 15, 1985 [JP] Japan .................. 60-179904

[51] Int. Cl.$^4$ .......................................... B60K 41/22
[52] U.S. Cl. ...................................... 74/869; 74/867; 192/3.58; 192/3.3
[58] Field of Search ............. 74/869, 867, 868, 752 C; 192/0.052, 0.076, 3.3, 3.51, 3.58, 0.092

[56] References Cited

U.S. PATENT DOCUMENTS

| | | | |
|---|---|---|---|
| 4,143,563 | 3/1979 | Shindo et al. | 74/869 X |
| 4,349,088 | 9/1982 | Ito et al. | 74/869 X |
| 4,391,166 | 7/1983 | Kubo et al. | 74/869 |
| 4,437,358 | 3/1984 | Kubo et al. | 74/869 |
| 4,466,311 | 8/1984 | Hiramatsu | 74/867 X |
| 4,502,354 | 3/1985 | Suzuki et al. | 74/866 |
| 4,512,212 | 4/1985 | Ishikawa | 74/869 |
| 4,534,244 | 8/1985 | Hiramatsu | 74/869 |
| 4,535,652 | 8/1985 | Nishikawa et al. | 192/0.092 X |
| 4,579,208 | 4/1986 | Nishikawa et al. | 192/0.052 X |
| 4,589,537 | 5/1986 | Nishikawa et al. | 192/0.052 |
| 4,596,164 | 6/1986 | Miki et al. | 74/869 |
| 4,603,601 | 8/1986 | Nishikawa et al. | 192/0.076 X |
| 4,633,739 | 1/1987 | Ogasawara et al. | 74/869 |
| 4,640,396 | 2/1987 | Nishimura | 192/0.076 X |

FOREIGN PATENT DOCUMENTS

| | | |
|---|---|---|
| 2035404 | 2/1971 | Fed. Rep. of Germany . |
| 3010509 | 9/1981 | Fed. Rep. of Germany . |
| 2149464 | 11/1984 | United Kingdom . |

OTHER PUBLICATIONS

Service Manual RN4F02A Type, RL4F02A Type Automatic transaxle, (A261C06) issued by Nissan Motor Company, Limited, dated 1984.

*Primary Examiner*—Dirk Wright
*Assistant Examiner*—David Novais
*Attorney, Agent, or Firm*—Foley & Lardner, Schwartz, Jeffery, Schwaab, Mack, Blumenthal & Evans

[57] ABSTRACT

A control for an automatic transmission with a lock-up type torque converter, comprises a lock-up control valve, a forward clutch control valve, an electromagnetic valve, and a shuttle valve. The shuttle valve normally assumes a first position where a control signal regulated by the electromagnetic valve is supplied to the forward clutch control valve to render same to regulate forward pressure for activating a forward clutch. The shuttle valve shifts to a second position thereof when the transmission establishes forward speed ratios except the first speed ratio. In the second position of the shuttle valve, the control pressure regulated by the electromagnetic valve is supplied to the lock-up control valve to render same to effect slip control and lock-up control of the torque converter.

9 Claims, 5 Drawing Sheets

4,843,920

COMBINED FORWARD PRESSURE AND TORQUE CONVERTER CONTROL FOR AUTOMATIC TRANSMISSION

COPENDING RELATED APPLICATIONS

Reference should be made to the following copending U.S. applications which have been assigned to the assignee of the present application.

U.S. application Ser. No. 885,136, filed on July 14, 1981 (now U.S. Pat. No. 4,793,215) claiming priority of Japanese Patent application No. 60-171866 filed on Aug. 6, 1985;

U.S. application Ser. No. 885,135, filed July 14, 1986, (now U.S. Pat. No. 4,770,066) claiming priority of Japanese Patent application No. 60-154244 filed on July 15, 1985;

U.S. application Ser. No. 890,371, filed on July 29, 1986, (now U.S. Pat. No. 4,765,202) of claiming priority Japanese Patent application No. 60-166646 filed on July 30, 1985;

U.S. application Ser. No. 890,370, filed on July 29, 1986, (now U.S. Pat. No. 4,765,203) claiming priority of Japanese Patent application No. 60-166647 filed on July 30, 1985;

U.S. application Ser. No. 893,243, filed on Aug. 5, 1986 (now U.S. Pat. No. 4,680,992), claiming priority of Japanese Patent Applications No. 60-171154 filed on Aug. 5, 1985, No. 60-171865 filed on Aug. 6, 1985, No. 60-171869 filed on Aug. 6, 1985, and No. 60-197078 filed on Sept. 6, 1985;

U.S. application Ser. No. 905-078 filed on Sept. 9. 1986, (now U.S. Pat. No. 4,753,134) claiming priority of Japanese Patent Applications No. 60-199318 filed on Sept. 11, 1985, and No. 60-199319 filed on Sept. 11, 1985.

U.S. application Ser. No. 905-268, filed on Sept. 9, 1986 (now U.S. Pat. No. 4,730,521) claiming priority of Japanese Patent Application No. 60-199316 filed on Sept. 11, 1985.

BACKGROUND OF THE INVENTION

The present invention relates to a control system for an automatic transmission, wherein forward pressure reduction control is combined with torque converter slip control.

Automatic transmissions are known which comprise a torque converter and a forward friction element (for example, a forward clutch) which is kept activated by forward pressure during operation with every forward speed ratio. In these known transmissions, a so-called select shock is unavoidable upon activating the forward friction element in effecting a shift from neutral to a drive range where the first speed ratio is selectable. When a vehicle is at a halt, the torque converter generates a drag torque, causing creep where the vehicle tends to move forward at a slow speed.

Since it is a fluid transmission device using hydraulic fluid as a medium, the torque converter cannot avoid slip taking place between its input and output elements, and thus has poor power transmission efficiency. In order to deal with this problem, a lock-up type torque converter has been widely used. The lock-up type torque converter is controlled such that when the torque multiplication function and torque variation absorption function are not required or unnecessary, the slip of the torque is limited or eliminated by providing slip engagement or complete engagement between the input and output elements.

As described in the publication entitled "SERVICE MANUAL RN4F02A TYPE, RL4F02A TYPE AUTOMATIC TRANSAXLE" (A261C06) issued by NISSAN MOTOR COMPANY, LIMITED, it has been the conventional practice to gradually increase the forward pressure (roller clutch activating hydraulic pressure) in order to alleviate select shock, and it has been proposed to decrease the forward pressure in order to prevent the occurrence of creep.

A conventional slip control of a torque converter is found in a KM175 type transmission manufactured by MITSUBISHI MOTOR COMPANY, LIMITED. According to this slip control, the lock-up clutch pressure is regulated so as to vary the engagement force of the lock-up clutch, thereby to limit slip in the torque converter.

These known measures, however, would pose a problem if it is intended to translate the above mentioned two controls into an electronic control because two solenoids are necessary, each for one of them. The fact that two solenoids are necessary is not advantageous from the standpoints of space saving and cost reduction.

An object of the present invention is to improve a control for an automatic transmission such that the above mentioned two controls are combined in such a manner as to save installation space and avoid cost increase.

SUMMARY OF THE INVENTION

According to the present invention, there is provided a control for an automatic transmission for an automotive vehicle having an engine and a torque converter drivingly disposed between the engine and the transmission, the transmission including a predetermined friction element which is kept activated during forward drive, the control comprising:

means including an electromagnetic means for generating a control signal under the control of said electromagnetic means;

means operable responsive to said control signal for controlling the degree of slip taking place in the torque converter;

means operable responsive to said control signal for controlling the degree of activation of the predetermined friction element; and means, operatively disposed between said control signal generating means, said means for controlling the degree of slip and said means for controlling the degree of activation, for supplying said control signal to said means for controlling the degree of slip and said means for controlling the degree of activation, selectively.

BRIEF DESCRIPTION OF THE DRAWINGS

FIG. 5 is a simplified schematic view of part of a control system for an automatic transmission embodying a main feature of the present invention;

DETAILED DESCRIPTION OF THE INVENTION

Referring to FIGS. 1A, 1B, 1C, 2, and 3, there is described a preferred embodiment according to the present. This embodiment is described in copending U.S. application Ser. No. 893,243, filed Aug. 5, 1986 now U.S. Pat. No. 4,690,992 claiming priority of Japanese Patent Application No. 60-171154 filed on Aug. 5, 1985, No. 60-171865 filed on Aug. 6, 1985, No. 60-171869 filed on Aug. 6, 1985, and No. 60-197078 filed on Sept. 6, 1985. This copending U.S. application has been filed by the same applicants of the present application and is to be commonly assigned herewith, the disclosure of which U.S. application is hereby incorporated by reference in its entirety (see FIG. 1A, 1B, 1C, FIG. 2 and 3 thereof).

Figure 4:
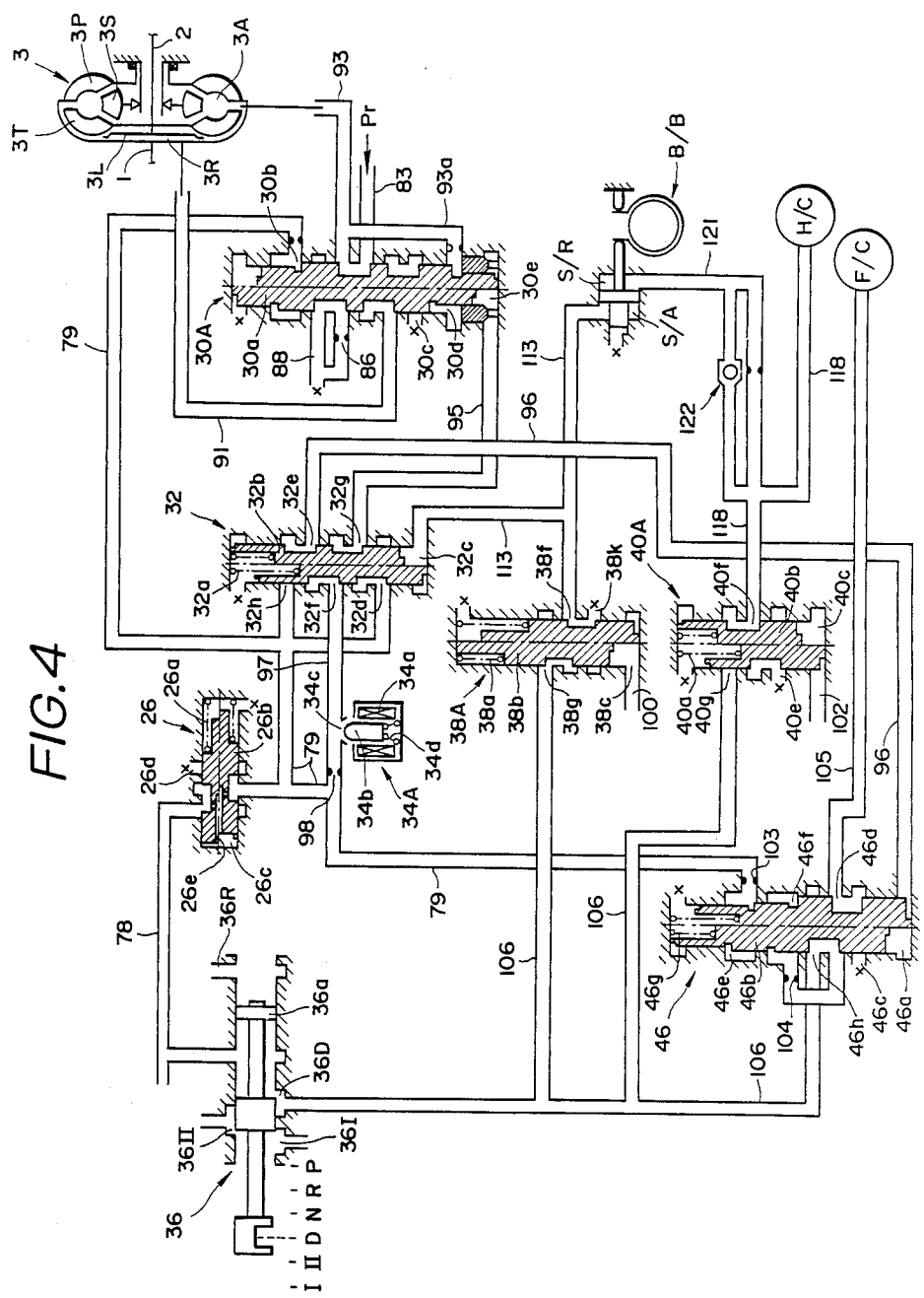

Referring to FIG. 4, there is shown a simplified hydraulic circuit embodying the present invention as applied to an automatic transmission which includes as friction elements a forward clutch F/C, a band brake B/B, and a high clutch H/C. The first speed ratio is selected by activating the forward clutch F/C. An upshift to the second speeed ratio is effected by activating the band brake B/B, and an upshift from the second speed ratio to the third speed ratio is effected by deactivating the band brake B/B and activating the high clutch H/C. The activation or deactivation of the band brake B/B is performed by a band servo B/S having a servo apply chamber S/A and a servo release chamber S/R. Supplying the servo apply chamber S/A with hydraulic fluid pressure causes the activation of the brake B/B, while supplying the servo release chamber S/R with hydraulic fluid pressure causes the deactivation of the band brake B/B regardless of the presence or absence of hydraulic fluid pressure within the servo apply chamber S/A because of the difference between pressure acting areas formed on a servo piston.

The transmission further includes a lock-up type torque converter 3 which has a pump impeller 3P (an input element) driven by the engine output shaft 1, a turbine runner 3T (an output element), a pump impeller 3P drivingly connected to a transmission input shaft 2, a stator 3S, and a lock-up clutch 3L arranged to selectively connect the input and output elements.

In operation of the torque converter 3, the lock-up clutch 3L is released to render the torque converter operable in converter state where there is no limitation to slip when hydraulic fluid is supplied to the release chamber 3L and then discharged from the apply chamber 3A. When the flow of hydraulic fluid is reversed, the lock-up clutch 3L is urged to assume its engaged position to render the torque converter 3 operable in lock-up state where there occurs no slip. In the process or reducing the difference in pressure between the apply and release chambers 3A and 3R, the lock-up clutch 3L stays in controlled slidable engagement state to render the torque converter 33 operable in controlled slip state where the degree of slip is controlled.

The transmission further includes a manual selector valve 36, a pilot valve 26, a first shift valve (i.e., a 1-2 shift valve) 38A, a second shift valve (i.e., a 2-3 shift valve) 40A, a shuttle valve 32, a forward clutch control valve 46, a lock-up control valve 30A and an electromagnetic valve in the form of a solenoid 43A.

The manual selector valve 36 comprises a spool 36a which is movable depending on manual select operation by a driver to a park (P) range, a reverse (R) range, a neutral (N) range, a forward automatic drive (D) range, a forward second speed engine brake (II) range, a forward first speed ratio engine brake (I) range. Selecting one of the above mentioned ranges causes a line pressure circuit 78 to communicate with the corresponding one of the input ports 36 D, 36 II, 36 I and 36 R in accordance with the pattern shown by the following table.

TABLE 1

| Range Port | P | R | N | D | II | I |
|---|---|---|---|---|---|---|
| 36 R | | o | | | | |
| 36 D | | | | o | o | o |
| 36 II | | | | | o | o |
| 36 I | | | | | | o |

In the above TABLE, the reference character "o" denotes the particular port which communicates with the line pressure circuit 78, while the other ports which are not denoted by this reference character are drained.

The pilot valve 26 comprises a spool 26b biased by a spring 26a to a position as illustrated by the upper half thereof as viewed in FIG. 4. The spool 26b has its remote end from the spring 26a exposed to a chamber 26c. The pilot valve 26 also includes a drain port 26d and is connected to a pilot pressure circuit 79. The spool 26b is formed with a connecting passage 26e which allows the transmission of the pressure from the pilot pressure circuit 79 to the chamber 26c. As the pressure within the chamber 26c rises, the spool 26b is urged for rightward movement as viewed in FIG. 4. This rightward movement of the spool 26b allows the pilot pressure circuit 79 to switch its connection from the line pressure circuit 78 to the drain port 26d.

With the pilot valve spool 26b held in the position as illustrated by the upper half thereof as viewed in FIG. 4, supplying the line pressure from the circuit 78 to the pilot valve 26 causes a rise in pressure within the circuit 79. This rise in pressure is supplied via the connection passage 26e to the chamber 26c, causing the rightward movement of the spool 26b as viewed in FIG. 4. This rightward movement of the spool 26b beyond the equilibrium state position as illustrated by the lower half thereof as viewed in FIG. 4 causes the circuit 79 to block its communication with the circuit 78 and at the same time open its communication with the drain port 26d. This results in a drop in pressure within the circuit 79, allowing the spool 26b to be pushed back by the spring 26a, causing the pressure within the circuit 79 to rise again. Thus, the pilot valve 26 reduces the line pressure from the circuit 78 down to a constant value that is determined by the spring force of the spring 26a and outputs the result to the circuit 79 as pilot pressure.

The 1-2 shift valve 38A includes a spring 38a biasing a spool 38b to a downshift position thereof as illustrated by the right half thereof as viewed in FIG. 4 where a port 38f is allowed to communicate with a drain port 38k. When a control pressure (i.e., a shift pressure), as high as a pilot pressure, is supplied through a circuit 100 to a chamber 38c, the spool 38b is urged to an upshift position thereof as illustrated by the left half position thereof as viewed in FIG. 4 where the port 38f is allowed to communicate with a port 38g. The 2-3 shift valve 40A includes a spring 40a biasing a spool 40b to a downshift position thereof as illustrated by the left half thereof as viewed in FIG. 4 where a port 4c is allowed to communicate with a drain port 40e. When a control pressure (i.e., a shift pressure), as high as the pilot pressure, is supplied through a circuit 102 to a chamber 40c, the spool 40b is urged to an upshift position thereof as illustrated by the right half thereof as viewed in FIG. 4 where the port 40f is allowed to communicate with a port 40g.

Figure 1A:
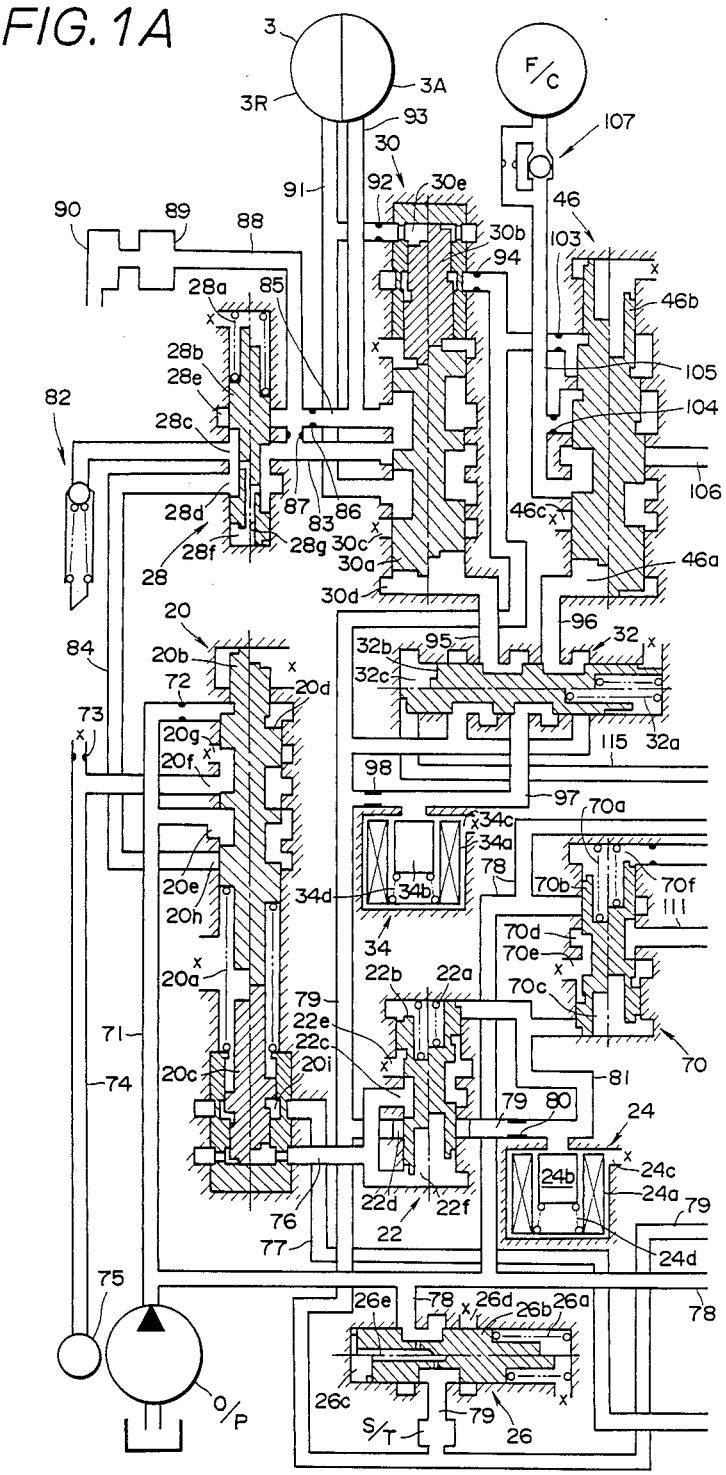
FIGS. 1A, 1B, and 1C when combined side by side, illustrate a electro-hydraulic control system for an automatic transmission for an automotive vehicle embodying the present invention.
Figure 1B:
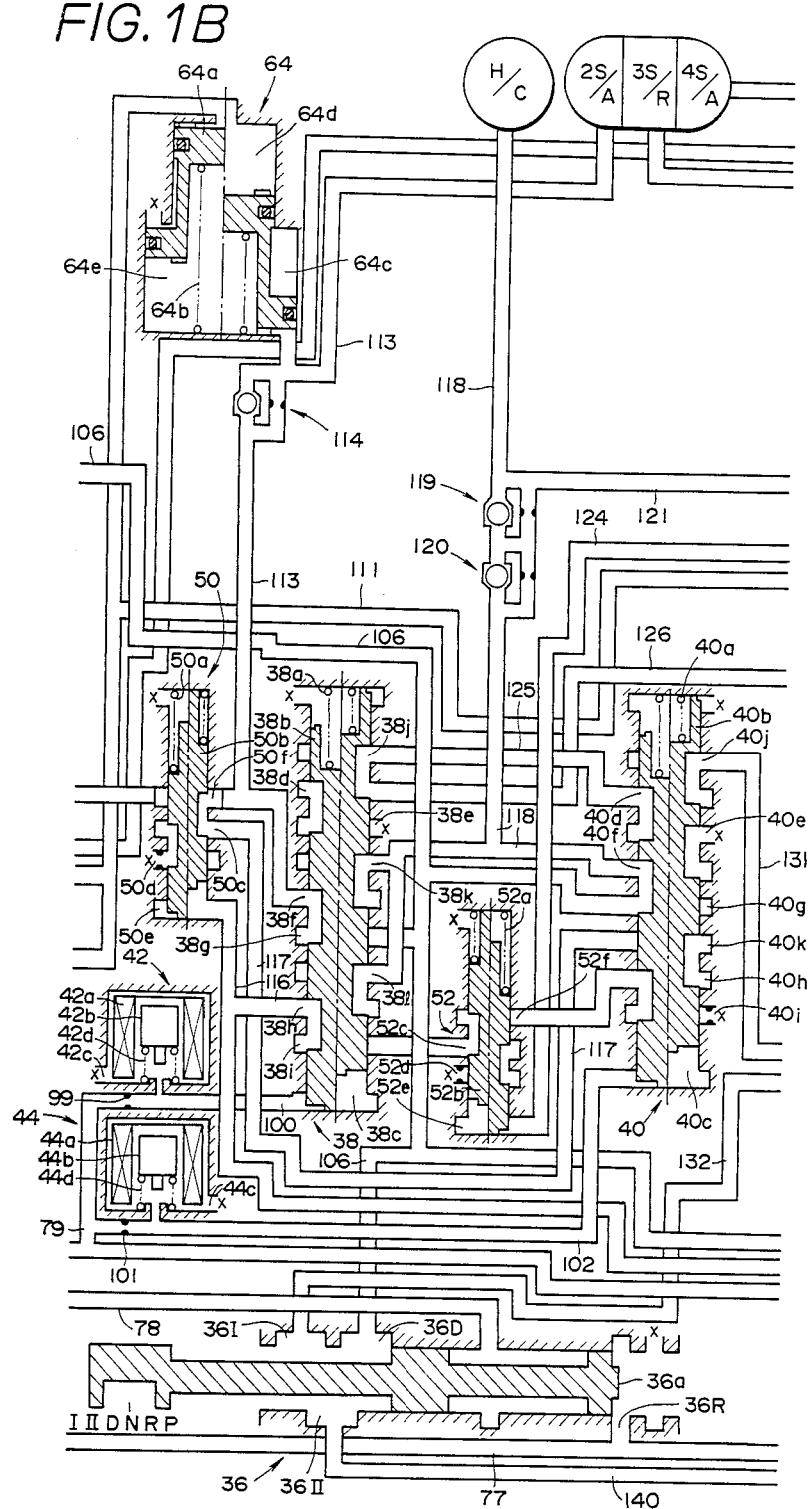

The magnitude of pressure in the circuits 100 and 102 is controlled by so-called shift solenoids such as shown in FIG. 1B at the reference numerals 42 and 44. Alternatively, reference should be made to U.S. Pat. No. 4,502,354 issued to Suzuki et al. on May 5, 1985 which discloses an electro-hydraulic control using a 1-2 shift solenoid 141 and a 2-3 shift solenoid 142.

The forward clutch control valve 46 comprises a spool 46b biased by a spring 46g. When the spool 46b assumes a position as illustrated by the right half thereof as viewed in FIG. 4, a port 46d connected to a circuit 105 is allowed to communicate with a drain port 46c. The pilot pressure is supplied through the circuit 79 to a chamber 46e via an orifice 103 to act on the spool 46b in a downward direction as viewed in FIG. 4. The spool 46b is subject to another downward force, too, created by the hydraulic pressure (i.e., a forward pressure) for activating the forward clutch F/C, which pressure is supplied, as a feedback pressure, to the clutch control valve 46 from the circuit 105 via the port 46d and an orifice 104. The spool 46b moves to a position where the sum of the above mentioned downward forces balances with an upward force due to the pressure within the chamber 46a. When the spool 46b assumes the position as illustrated by the left half thereof as viewed in FIG. 4, the circuit 105 is allowed to communicate with a circuit 106. The circuit 105 is connected to the forward clutch F/C. The circuit 106 is connected to the port 36 D of the manual selector valve 36.

The lock-up control valve 30A includes a spool 30a which is urged toward the position as illustrated by the right half thereof as viewed in FIG. 4 by a force caused by the pilot pressure supplied to a chamber 30b from the circuit 79. In this position of the spool 30a, a circuit 93 connected to the torque converter apply chamber 3A is allowed to communicate with a circuit 83, and a circuit 91 connected to the torque converter release chamber 3R is allowed to communicate with a drain port 30c. This causes torque converter supply pressure Pr to be supplied not only to the torque converter apply chamber 3A, but also to an oil cooler circuit 88 via an orifice 86, and this causes the hydraulic pressure within the torque converter release chamber 3R to be drained. The hydraulic pressure within the circuit 93 is supplied via a branch circuit 93a to a chamber 30d, urging the spool 30a upwards as viewed in FIG. 4. As a result, the spool 30a assumes a position where the sum of the upward force due to the pressure within the chamber 30d and an upward force due to a pressure within the chamber 30e balances with the downward force due to the pilo pressure within the chamber 30b. When the spool 30a assumes the position as illustrated by the left half thereof, the circuit 93 is allowed to communicate with the oil cooler circuit 88, while the circuit 91 is allowed to communicate with the torque converter supply pressure circuit 83.

The pilot pressure circuit 79 is connected to ports 32b and 32d of the shuttle valve 32. The shuttle valve 32 is designed to effect stroke control of the lock-up control valve 30A as well as that of the forward clutch control valve 46. The shuttle valve 32 includes a spool 32b and a spring 32a biasing the spool 32b to a position as illustrated by the left half thereof as viewed in FIG. 4 where a port 32g is allowed to communicate with the port 32d and at the same time a port 32e is allowed to communicate with a port 32f. When the spool 32b is urged by a pressure within a chamber 32c against the spring 32a to assume a position as illustrated by the right half thereof as viewed in FIG. 4, the port 32g is allowed to communicate with the port 32f and at the same time the port 32e is allowed to communicate with the port 32b. When the spool 32b assumes the position as illustrated by the left half thereof as viewed in FIG. 4, The shuttle valve 32 allows the circuit 95 connected to the chamber 30e to communicate with the pilot pressure circuit 79 via the port 32d and a circuit 96 connected to the chamber 46a to communicate with a circuit 97 connected to the pilot pressure circuit 79 via an orifice 98. When the spool 32b moves to the position as illustrated by the right half thereof, the shuttle valve 32 allows the circuit 95 to communicate with the circuit 97 and the circuit 96 to communicate with the circuit 79. The circuit 97 is formed with a drain port 34c that is opened or closed by the solenoid 34A.

The solenoid 34A comprises a coil 34a, a spring 34d and a plunger 34b biased to a close position by the spring 34d. When the coil 34a is turned ON (i.e., when electric current passes through the coil 24a), the plunger 34b is electromagnetically pulled against the spring 34d to an open position where the circuit 97 is drained at the port 34c. Under the control of a computer, not illustrated, the coil 34a of the solenoid 34A is turned ON intermittently. The ratio of ON time to the period which is constant (i.e., duty cycle) is controlled, causing pressure within the circuit 97 to vary in dependence on the duty cycle. In the case where the shuttle valve 32 assumes the position as illustrated by the right half thereof and the control pressure within the circuit 97 is used to effect the stroke control of the lock-up control valve 30A, the duty cycle of the solenoid 34A is determined as follows. That is, the duty cycle should be 0% to allows the control pressure within the circuit 97 to increase as high as the pilot pressure within the circuit 79 when the engine operates with heavy load at low speeds where the torque multiplying function of the torque converter 3 and the torque variation absorbing function thereof are required. Under this condition, the control pressure supplied to the chamber 30e urges the spool 30a to the position as illustrated by the left half thereof, rendering the torque converter 3 to operate in the converter state. As the degree of requirement of the above mentioned two functions performed by the torque converter 3 decreases, the duty cycle should be increased to bring down the control pressure, rendering the torque converter 3 to operate in the desired slip state. When the engine operates with light load at high speeds where the above mentioned functions of the torque converter are not required, the duty cycle should be 100% to bring down the control pressure to zero, allowing the torque converter 3 to operate in the lock-up state.

In the case where the shuttle valve 32 assumes the position as illustrated by the left half thereof as viewed in FIG. 4 and the control pressure within the circuit 97 is used to effect the stroke control of the forward clutch control valve 46, the duty cycle of the solenoid 34A is determined in such a manner as later described that N-D select shock is alleviated and creep is prevented.

The port 32g of the shuttle valve 32 is connected via the circuit 95 to the chamber 30e of the lock-up control valve 30A. The port 32e is connected via the circuit 96 to the chamber 46a of the forward clutch control valve 46. The port 6h is connected via the circuit 106 to the port 36 D of the manual selector valve 36, and the port 46d is connected via the conduit 105 to the forward clutch F/C. The circuit 106 is connected also to the ports 38g of the 1-2 shift valve 38A and the port 40g of the 2-3 shift valve 40A. The port 38f of the 1-2 shift valve 38A is connected via a circuit 113 to the servo apply chamber S/A and also to the chamber 32c of the shuttle valve 32. The port 40f of the 2-3 shift valve 40A is connected via a circuit 118 to the high clutch H/C. This port 40f is connected via the circuit 118 and a branch circuit 121 to the servo release chamber S/R. There is provided a one-way orifice 122 in the branch circuit 121.

The operation of this embodiment is as follows:

When a driver places the spool 36a of the manual selector valve 36 at D range position, the line pressure from the circuit 78 is allowed to output from the output port 36D. Thus, the line pressure is supplied via the circuit 106 to the ports 38g, 40g and 46h.

Under this condition, when the pressure within the circuit 100 and that within the circuit 102 are low, the spools 38b and 40b of the 1-2 shift valve 38A and 2-3 shift valve 40A assume their downshift positions, respectively, the hydraulic pressure within the servo apply chamber S/A is drained at the drain port 38k, and at the same time the hydraulic fluid pressure within the servo release chamber S/R and within the high clutch H/C is drained at the drain port 40e. Since the spool 46b of the forward control valve 46 assumes the position illustrated by the right half thereof as viewed in FIG. 4, the forward clutch F/C is allowed to communicate with the drain port 46c and thus deactivated.

Under this condition, since the hydraulic fluid pressure within the circuit 113 connected to the servo apply chamber S/A is drained, no pressure exists within the chamber 32c, leaving the spool 32b of the shuttle valve 32 to assume the position illustrated by the left half thereof as viewed in FIG. 4. This causes the pilot pressure in the circuit 79 to be supplied via the ports 32d, 32g and circuit 95 to the chamber 30e, thus holding the spool 30a to the position illustrated by the left half thereof as viewed in FIG. 4. This also causes the control pressure (i.e., solenoid controlled pressure) within the circuit 97 to be supplied via the ports 32f, 32e and circuit 96 to the chamber 46a of the forward clutch control valve 46. The forward clutch control valve 46 is controlled by the control pressure supplied to the chamber 46a.

Upon selecting D range, the duty cycle of the solenoid 34A takes a predetermined relatively large value to supply the chamber 46a with pressure having a relatively small value corresponding to the duty cycle, applying an upward force to the spool 46b as viewed in FIG. 4, urging it to move upwards from the position as illustrated by the right half thereof as viewed in FIG. 4. In the process of this upward movement, when the spool 46b reaches a predetermined position where the drain port 46c is covered and the port 46h connected to the circuit 106 begins to be uncovered, the line pressure begins to be supplied from the port 46h to the port 46d, causing generation of a pressure (i.e., a forward pressure) at the port 46d. This pressure is supplied via the orifice 104 to the chamber 46f, acting on the spool 46b to urge it downwards as viewed in FIG. 4. As a result, the forward pressure generated at the port 46d takes a value corresponding to the pressure supplied to the chamber 46a when the spool 46b assumes the equilibrium position where the port 46d is disconnected from the ports 46c and 46h. The forward pressure is supplied via the circuit 105 to the forward clutch F/C. Because the pressure supplied to the chamber 46a is small, this forward pressure causes the forward clutch F/C to assume a position where it is about to engage without any backlash. Thus, the forward clutch F/C does not perform any substantial power transmission. This results in elimination of select shock which otherwise would occur upon selecting D range.

When the driver wishes to halt the vehicle with D range the above mentioned state continue to exist until he/she steps on the accelerator pedal. This causes interruption of the transmission of drag torque generated by the torque converter, thus preventing the occurrence of creep event.

When the driver steps on the accelerator pedal to initiate start-up operation, the duty cycle decreases at a speed corresponding to a speed at which the accelerator pedal is depressed, causing the solenoid controlled pressure supplied to the chamber 46a to rise at the corresponding speed. This causes the forward pressure to increase at the corresponding speed, causing the engagement of the forward clutch F/C to progress at the corresponding speed. As a result, the forward clutch F/C is activated and the transmission establishes the first speed ratio, permitting the vehicle to move off from a halt. Since, as mentioned above, the engagement of the forward clutch F/C progresses at the speed corresponding to the speed at which the accelerator pedal is depressed, the engine will not race and no shocks will occur during this start-up operation.

Under this condition, the lock-up control valve 30A is kept at the position as illustrated by the left half thereof as viewed in FIG. 4 where the torque converter supply pressure from the circuit 83 is supplied via the circuit 91 to the release chamber 3L, while the hydraulic fluid having past through the torque converter 3 is discharged from the apply chamber 3A via the circuits 93 and 88. Thus, the torque converter continues to operate in the converter state during running with the first speed ratio. This does not cause any inconvenience because the slip control for the torque converter is not so demanded during running with the first speed ratio.

In this state, when the control pressure within the circuit 100 rises and becomes as high as the pilot pressure, the 1-2 shift valve 38A assumes the upshift position as illustrated by the left half thereof as viewed in FIG. 4. This causes the line pressure within the circuit 106 to pass through the circuit 113 to the servo apply chamber S/A to activate the band brake B/B, causing the automatic transmission to shift to the second speed ratio.

When the control pressure within the circuit 102 is also rises and becomes as high as the pilot pressure, the 2-3 shift valve 40A assumes the upshift position as illustrated by the right half thereof as viewed in FIG. 4. This causes the line pressure within the circuit 106 to pass through the circuit 118 to the high clutch H/C on one hand, and to pass through the circuits 118 and 121 to the servo release chamber S/R on the other hand. As a result, the band brake B/B is deactivated and the high clutch H/C is activated, and the automatic transmission effects shifting upto the third speed ratio.

When, subsequently, the pressure within the circuit 102 drops to cause the spool 40b of the 2-3 shift valve 40A to move downwards to the downshift position as illustrated by the left thereof as viewed in FIG. 4, the port 40f is allowed to communicate with the drain port 40e, draining the pressure supplied to the high clutch H/C at the drain port 40e, deactivating the high clutch H/C. At the same time, this causes the pressure supplied to the servo release chamber S/R to be drained at a predetermined rate which will be described later in detail, allowing the gradual activation of the band brake B/B. Thus, with the appropriate donwshift timing, the automatic transmission downshifts from the third speed ratio to the second speed ratio.

With the other forward speed ratios except the first speed ratio, the line pressure continues to be supplied from the circuit 113 to the servo apply chamber S/A and also to the chamber 32C of the shuttle valve 32, holding the shuttle valve 32 to the position as illustrated by the right half thereof as viewed in FIG. 4. This causes the solenoid controlled pressure supplied to the port 32f is transmitted through the circuit 95 to the chamber 30e of the lock-up control valve 30A, thus subjecting the lock-up control valve 30A to stroke control by the solenoid 34A. That is, the duty cycle should be 0% to allow the control pressure within the circuit 97 to increase as high as the pilot pressure within the circuit 79 when the engine operates with heavy load at low speeds where the torque multiplying function of the torque converter 3 and the torque variation absorbing function thereof are required. Under this condition, the control pressure supplied to the chamber 30e urges the spool 30a to the position as illustrated by the left half thereof, rendering the torque converter 3 to operate in the converter state. As the degree of requirement of the above mentioned two functions performed by the torque converter 3 decreases, the duty cycle should be increased to bring down the control pressure, rendering the torque converter 3 to operate in the desired slip state. When the engine operates with light load at high speeds where the above mentioned functions of the torque converter are not required, the duty cycle should be 100% to bring down the control pressure to zero, allowing the torque converter 3 to operate in the lock-up state.

When the torque converter 3 is to be operated in the controlled slip state, the duty cycle of the solenoid 34A is controlled in correspondance with the degree of slip desired. The solenoid controlled pressure corrsponding to magnitude to this duty cycle acts at the chamber 30e on the spool 30a with an upward force as being assisted by the feedback pressure supplied to the chamber 30d, causing the spool 30a to move upwards from the position as illustrated by the right half thereof against the pilot pressure within the chamber 30b. This upward movement causes the communication between the circuits 83 and 93 to be decreased to reduce the pressure within the apply chamber 3A and also causes the communication between the circuit 91 and the drain port 30c to increse the pressure within the release chamber 3R, thus decreasing a difference in pressure between the chambers 3A and 3R. As a result, the lock-up clutch 3L assumes the controlled slip engagement state. Since the spool 30a ceases its movement when the feedback presure within the chamber 30d (i.e., the pressure within the servo apply chamber 3A) reaches a value corresponding to the solenoid controlled pressure within the chamber 30e, the degree of slip state in the torque converter can be controlled as desired by controlling the solenoid controlled pressure supplied to the chamber 30e.

Under this condition where the shuttle valve 32 continues to stay in the position as illustrated by the right half thereof as viewed in FIG. 4, the forward clutch control valve 46 is held to the position as illustrated by the left half thereof as viewed in FIG. 4 because it receives the pilot pressure through the circuit 96 from the circuit 79. Thus, the forward clutch F/C is kept fully engaged by the line pressure supplied thereto through the circuits 106 and 105. This, however, does not cause any inconvenience because controlling the forward pressure during running with the second speed and third speed ratios is not necessary.

Figure 1C:
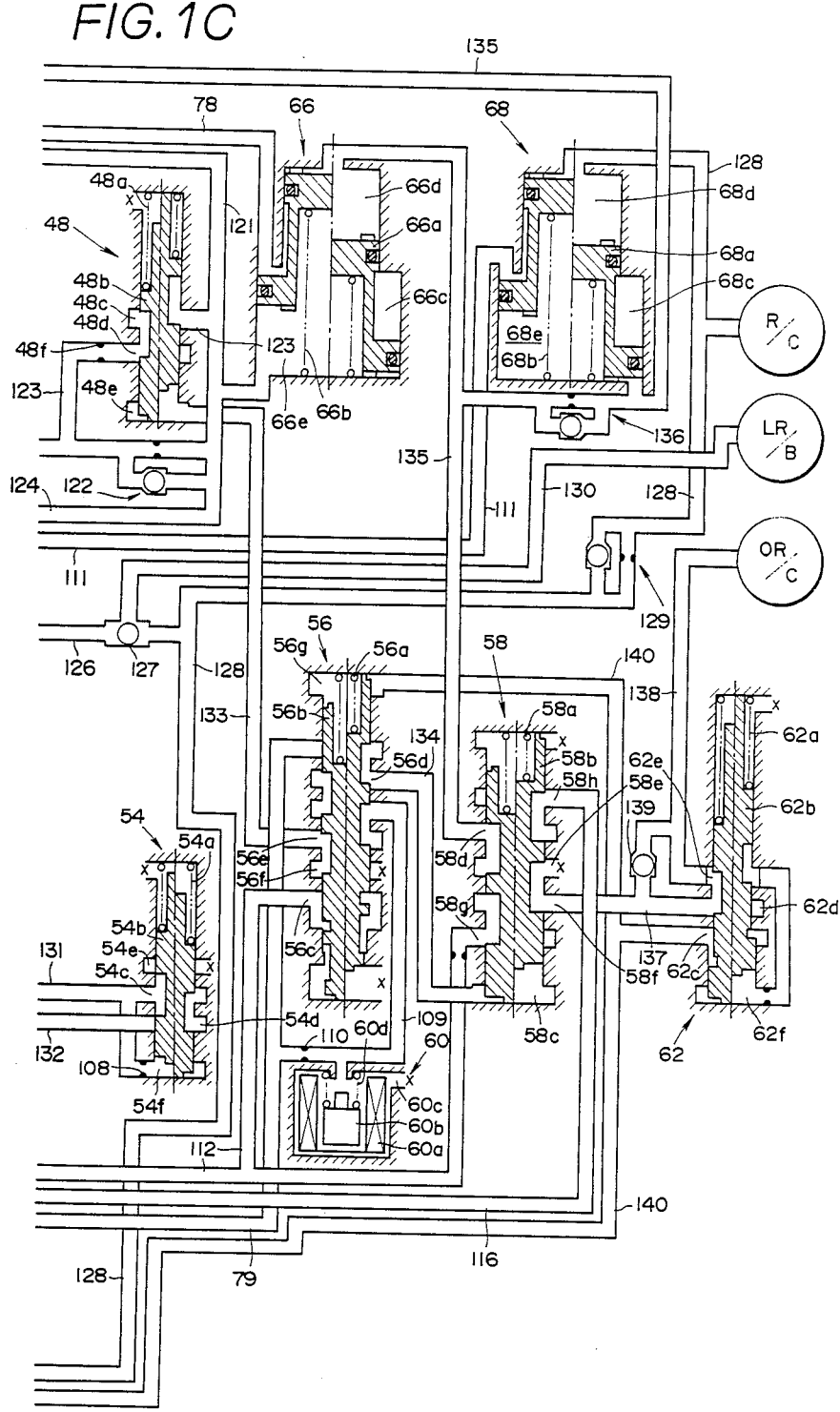
Figure 2:
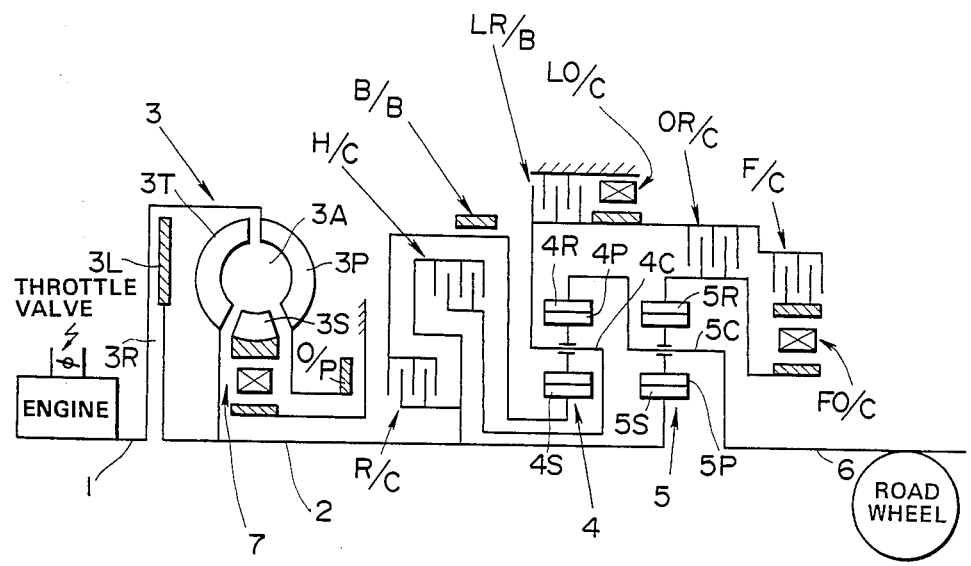
FIG. 2 is a schematic view showing the power train of the automatic transmission with an engine and a road wheel of the automotive vehicle.
Figure 3:
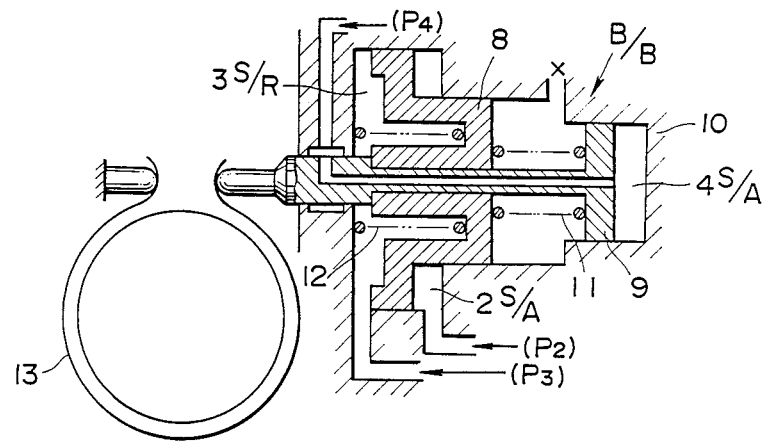
FIG. 3 is a schematic sectional view of a band brake.

In the case where he/she wishes engine brake to be effected with the transmission locked to the second speed ratio or the first speed ratio, the drive places the spool 36a of the manual selector valve 36 at II range or I range. When the spool 36a of the manual selector valve 36 assumes II range, the line pressure from the circuit 78 is supplied also to the port 36 II as will be understood from the TABLE 1, and when the spool 36a of the manual selector valve 36 is shifted to I range, the line pressure from the circuit 78 is supplied also to the port 36 I. The line pressure from the port 36 II arrives via a circuit network, not illustrated, at predetermined portions, causing the forward clutch F/C and band brake B/B to be activated to lock the transmission to operate with the second speed ratio, and causing the overrun clutch, not illustrated in FIG. 4 although such is illustrated in FIG. 1C at OR/C, to be activated to effect engine brake running. The line pressure from the port 36 I arrives via a circuit network, not illustrated, at predetermined portions, prohibiting activations of all of the friction elements except the forward clutch F/C to lock the transmission to operate with the first speed ratio as long as vehicle speed satisfies a predetermined condition (viz., the second speed ratio is established before the first speed ratio is established when he vehicle speed is high enough to cause the engine to overrun), causing the overrun clutch to be activated to keep engine brake running.

When the driver places the spool 36a of the manual selector valve 36 at R range for reverse drive, the line pressure from the circuit 78 is supplied only to the port 36 R as shown in TABLE 1. The line pressure from the port 36 R arrives at the appropriate friction elements, not shown, which are to be activated for establishing the reverse drive.

What is claimed is:
1. In an automatic transmission for an automotive vehicle having an engine and a torque converter drivingly disposed between the engine and the transmission:
   a predetermined friction element which is kept activated during forward drive;
   means for generating a hydraulic fluid under pressure,
   a manual selector valve having a neutral range and a drive range, said manual selector valve delivering said hydraulic fluid under pressure when said manual selector valve is shifted from said neutral range to said drive range;
   means when rendered operable for controlling a degree of slip taking place in the torque converter;
   means when rendered operable for controlling a degree of activation of the predetermined friction element by regulating supply of said hydraulic fluid to said predetermined friction element and discharge of hydraulic fluid from the predetermined friction element; and means for selectively rendering operable said means for controlling the degree of slip and said means for controlling the degree of activation.

2. A transmission as claimed in claim 1, wherein said selectively rendering means includes a pilot valve generating a pilot pressure, and an electromagnetic valve which effects a pressure reduction on said pilot pressure to generate a control signal.

3. A transmission as claimed in claim 1, wherein said means for controlling the degree of slip includes a lock-up control valve.

4. A transmission as claimed in claim 1, wherein the predetermined friction element is a forward clutch and said means for controlling the degree of activation includes a forward clutch control valve.

5. A transmission as claimed in claim 1, wherein said selectively rendering means includes a shuttle valve normally assuming a first position thereof and shiftable to a second position thereof when the transmission establishes forward speed ratios except a first speed ratio, said shuttle valve supplying a control signal to said means for controlling the degree of activation when assuming said first position thereof, said shuttle valve supplying said control signal to said means for controlling the degree of slip when assuming said second position thereof.

6. A transmission as claimed in claim 5, wherein said selectively rendering means includes a pilot valve generating a pilot pressure, and an electromagnetic means includes an electromagnetic valve which effects a pressure reduction on said pilot pressure to generate said control signal.

7. A transmission as claimed in claim 6, wherein said shuttle valve is connected to said pilot valve to receive said pilot pressure, and wherein said shuttle valve supplies said pilot pressure to said means for controlling the degree of slip when assuming said first position thereof and said shuttle valve supplies said pilot pressure to said means for controlling the degree of activation when assuming the second position thereof.

8. In an automatic transmission for an automotive vehicle having an engine, the automatic transmission being shiftable between a plurality of forward speed ratios including a first forward speed ratio:
a torque converter including a lock-up clutch drivingly connected to the engine;
a forward drive friction element;
means for supplying a forward drive hydraulic pressure to said forward drive friction element in each of the plurality of forward speed ratios;
means including an electromagnetic means for generating a control signal under the control of said electromagnetic means;
means for controlling said lock-up clutch;
means for reducing said forward drive hydraulic pressure;
a valve movable between a first position wherein said control signal is supplied to act on said forward drive hydraulic pressure reducing means and a second position wherein said control signal is supplied to act on said lock-up clutch controlling means;
means for urging said valve to shift from said first position to said second position when said automatic transmission shifts from the first speed ratio to one of the plurality of forward speed ratios other than the first forward speed ratio.

9. In an automatic transmission for an automotive vehicle having an engine, the automatic transmission being shiftable between a plurality of forward speed ratios including a first forward speed ratio:
a torque converter including a lock-up clutch drivingly connected to the engine;
a forward drive friction element;
means for supplying a forward drive hydraulic pressure to said forward drive friction element in each of the plurality of forward speed ratios;
means including an electromagnetic means for generating a control signal under the control of said electromagnetic means;
means for controlling said lock-up clutch;
means for reducing said forward drive hydraulic pressure;
a valve including a spool movable between a first position wherein said control signal is supplied to act on said forward drive hydraulic pressure reducing means and a second position wherein said control signal is supplied to act on said lock-up clutch controlling means, said valve including a spring biasing said spool toward said first position thereof, and a pressure chamber, said spool having a pressure acting area exposed to said pressure chamber, said spool being movable against said spring in response to pressure build-up in said pressure chamber;
shift valve means for delivering a hydraulic pressure when the automatic transmission is in one of the plurality of forward speed ratios except the first forward speed ratio;
said pressure chamber of said valve means being in communication with said shift valve means to receive said hydraulic pressure delivered by said shift valve means.

* * * * *